UNITED STATES PATENT OFFICE.

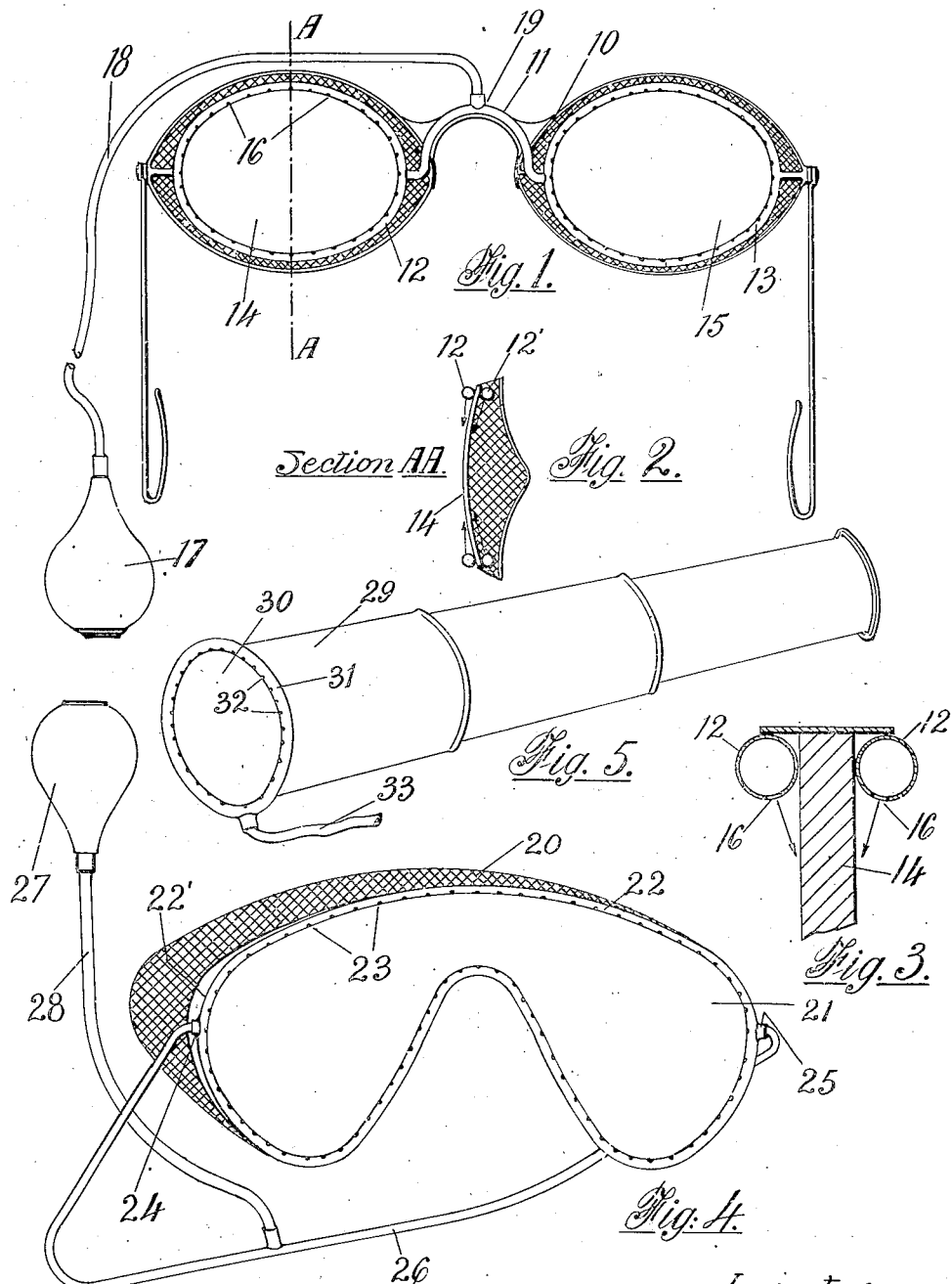

CARLO DE-FELICE, OF NEW YORK, N. Y.

LENS-CLARIFYING APPARATUS.

1,354,433. 	Specification of Letters Patent. 	Patented Sept. 28, 1920.

Application filed August 5, 1919. Serial No. 315,537.

*To all whom it may concern:*

Be it known that I, CARLO DE-FELICE, a citizen of the United States, residing in the borough of Manhattan, in the city of New York, county and State of New York, have invented certain new and useful Improvements in Lens-Clarifying Apparatus, of which the following is a full, clear, and exact description, reference being had to the accompanying drawings, forming a part of this specification.

This invention relates to a novel apparatus for removing cloudiness from glass in safety goggles, spectacles, etc., its use being also possible in connection with lenses in optical instruments, etc. and generally glass parts of such devices, where the maintenance of clarity of vision is of prime importance.

My improved apparatus consists substantially of means adapted to cause a current or currents of air to come in contact with the cloudy glass surfaces and to thus cause or quicken the evaporation of the vapor particles condensed on said surfaces, and causing the cloudiness of the same.

That currents of air facilitate evaporation and therefore quickened the drying of surfaces exposed to the same is a well known fact; and in my improved apparatus I simply use this property of air currents to advantage in removing cloudiness from glass and I provide simple means for putting the apparatus into practice, which I have found both practical and efficient.

A few of the possible applications of my improved apparatus are shown in the annexed drawings in which:

Figure 1— is a front view in elevation of a pair of safety goggles, constructed in accordance with my method;

Fig. 2— is a side sectional view in elevation through line A—A of Fig. 1;

Fig. 3— is an enlarged detailed sectional view in elevation showing the manner in which the air currents are forced against the glass surfaces;

Fig. 4— is a view in perspective of a different type of goggle, in the construction of which my apparatus is also applied; and Fig. 5— is a view in perspective of telescope showing my apparatus applied to one of the lenses of the same.

In order to cause jets of air to be directed against the surfaces of the glass, I provide tubular frames or members having perforations close to said surfaces, forming outlets for air which may be forced through said tubular members by any suitable means.

For ordinary purposes in connection with goggles, spectacles and the like, I have found a rubber bulb to be satisfactory and to deliver a sufficient amount of air to enable the wearer of the glasses to remove the cloudiness from the same in a short time. This does away with the necessity often experienced by the wearer of removing the glasses for cleaning purposes; this feature is therefore most important in connection with safety goggles where it is necessary that clarity of vision be preserved, but that safety conditions be maintained at all times.

Referring to Figs. 1, 2 and 3, numeral 10 designates a pair of safety goggles such as ordinarily used in foundries and shops by workers applied to dangerous occupations. The same consists of a tubular frame comprising a bridge portion 11 and two glass frames each consisting of a front tubular member 12, 13 and a rear tubular member 12', 13'. The glass members 14, 15 are mounted between said front and rear tubular members as shown in detail in Figs. 2 and 3.

Said tubular members are provided with a plurality of air outlets or perforations 16 which are close to the surfaces of the glass. 17 designates an ordinary rubber bulb, provided with flexible tube 18 of a suitable length connected at 19 to bridge member 11.

It is obvious that upon pressing bulb 17, air will be forced through tube 18 and tubular members 11, 12, 13, 12', 13' and finally through outlets 16 against the surfaces of glasses 14, 15. Safety goggles are usually worn for hours at a stretch and are apt to become cloudy after being used for sometime; and an arrangement such as illustrated is very efficient in removing such cloudiness when due to vapor condensation as is usually the case.

In Fig. 4, I illustrate another style of safety goggle 20 provided with a single glass 21, mounted between two tubular frames 22, 22'. Said tubular frames are provided with perforations 23 at convenient points and are connected at 24, 25 with preferably flexible tubular straps 26, through which air may be forced as heretofore explained by means of a bulb 27 and tube 28. The operation is the same as explained in connection with the goggle represented in Figs. 1, 2, 3.

In Fig. 5, a similar arrangement is shown in connection with a telescope 29 in which the lens 30 is surrounded by a tubular frame 31 provided with perforations 32, through which air may be forced and directed against the surface of the lens through the operation of a rubber bulb, not shown, connected to tube 33.

From the foregoing, it is seen that I provide novel means for removing cloudiness from glasses, which is especially useful in connection with safety goggles and similar devices which it is desirable to maintain clean without the necessity of removal. It is also seen that I provide novel constructions of devices embodying the application of my apparatus for the purposes set forth.

I reserve myself the right to use my apparatus in such modified forms as may be convenient to satisfy different requirements and which enter fairly into the scope of the appended claims.

I claim—

1. In a device of the class described and in connection with a glass member mounted in the line of vision, a tubuar frame having perforations close to the surface of said glass member and means causing air under pressure to issue through said perforations.

2. A safety goggle comprising a glass member, a tubular frame having perforations close to its surface and means for causing air under pressure to issue through said perforations.

3. A safety goggle comprising a glass member, a tubular frame having perforations close to the surface of said member, hand operated means for producing a jet of air and a tube connecting said hand operated means to said tubular frame.

4. In a device of the class described, the combination of a lens, and hand operated means for directing air under pressure against the surface of said lens.

Dr. CARLO DE-FELICE.

Witnesses:
 Italo Fugazy,
 Emilo Conti.